United States Patent
Mitchell et al.

(10) Patent No.: US 9,986,731 B2
(45) Date of Patent: Jun. 5, 2018

(54) MOTORIZED GAME CART

(71) Applicant: Chimney Rock Enterprises, L.L.C., Glendive, MT (US)

(72) Inventors: Ervin A. Mitchell, Glendive, MT (US); Thomas H. Ames, Glendive, MT (US)

(73) Assignee: Chimney Rock Enterprises, L.L.C., Glendive, MT (US)

( * ) Notice: Subject to any disclaimer, the term of this patent is extended or adjusted under 35 U.S.C. 154(b) by 117 days.

(21) Appl. No.: 15/153,342

(22) Filed: May 12, 2016

(65) Prior Publication Data

US 2017/0325445 A1 Nov. 16, 2017

(51) Int. Cl.
| | |
|---|---|
| *A01M 31/00* | (2006.01) |
| *B62B 5/00* | (2006.01) |
| *B62B 5/04* | (2006.01) |
| *B62B 5/06* | (2006.01) |
| *B62B 3/00* | (2006.01) |
| *B62B 3/02* | (2006.01) |
| *B62B 3/06* | (2006.01) |

(52) U.S. Cl.
CPC ........... *A01M 31/006* (2013.01); *B62B 3/002* (2013.01); *B62B 3/02* (2013.01); *B62B 3/0606* (2013.01); *B62B 5/0033* (2013.01); *B62B 5/0442* (2013.01); *B62B 5/061* (2013.01); *B62B 5/067* (2013.01); *B62B 5/0452* (2013.01); *B62B 2202/42* (2013.01); *B62B 2203/72* (2013.01)

(58) Field of Classification Search
CPC . B62B 2203/72; B62B 5/061; B62B 2202/42; B62B 3/002; A01M 31/006; B62D 61/02; B62D 51/04

USPC .................................................. 414/559, 538
See application file for complete search history.

(56) References Cited

U.S. PATENT DOCUMENTS

| | | | | |
|---|---|---|---|---|
| 2,855,061 A | * | 10/1958 | Lilienthal | B62B 3/009 180/19.1 |
| 2,869,661 A | * | 1/1959 | Fernandez | B62B 3/009 180/19.1 |
| 2,992,834 A | * | 7/1961 | Tidwell | B60T 11/04 280/47.3 |
| 3,056,449 A | | 9/1962 | Murphy | |
| 3,212,595 A | | 10/1965 | Mathews et al. | |
| 4,444,405 A | * | 4/1984 | Barrus | B62B 1/12 280/47.3 |
| 5,620,193 A | * | 4/1997 | Dschaak | B62B 1/22 280/47.31 |
| 6,604,749 B2 | * | 8/2003 | Woodbury | A22B 7/006 280/47.35 |
| 6,811,179 B2 | | 11/2004 | Woods | |
| 7,891,670 B2 | | 2/2011 | Alajbegovic | |
| 8,366,125 B2 | | 2/2013 | Loomans | |

(Continued)

*Primary Examiner* — Mark C Hageman
(74) *Attorney, Agent, or Firm* — Antoinette M. Tease

(57) ABSTRACT

A motorized cart with a frame, the frame having a floor, a first elongated side wall, a second elongated side wall, a rear wall, and a front wall that is hingedly connected to the floor. The cart includes a winch that is situated on the rear wall of the cart. A winch belt with a hook on the end of it extends forward from the rear wall. The cart has two wheels that are longitudinally aligned with one another so that one wheel is directly in front of the other wheel, and the wheels are centered longitudinally within the floor of the cart. The cart also has an electric motor that is powered by a battery and is operable in both forward and reverse gear.

4 Claims, 17 Drawing Sheets

(56) References Cited

U.S. PATENT DOCUMENTS

| | | |
|---|---|---|
| 8,613,455 B2 | 12/2013 | Berrett et al. |
| 2003/0205885 A1 | 11/2003 | Woods |
| 2004/0084864 A1 | 5/2004 | Casey et al. |
| 2010/0253023 A1 | 10/2010 | Loomans |
| 2012/0000718 A1 | 1/2012 | Berrett et al. |

* cited by examiner

MOTORIZED GAME CART

BACKGROUND OF THE INVENTION

1. Field of the Invention

The present invention relates generally to the field of motorized carts, and more specifically, to a motorized game cart with an in-line (tandem) wheel orientation, winch, tailgate, adjustable outriggers, and other structural features not found in the prior art.

2. Description of the Related Art

Existing game carts, such as the one described in U.S. Pat. No. 6,793,236 (Mitchell, 2004), incorporate a side-by-side wheel configuration that is advantageous in certain situations but disadvantageous in rugged terrain with narrow trails. The present invention is a motorized game cart with an in-line wheel configuration and a narrower frame that allows the cart to be used in situations where side-to-side clearance is an issue. Conventional game carts also make no provision for uneven terrain, that is, situations where one side of the cart might be on higher or lower ground than the other side of the cart. Furthermore, to the best of the inventors' knowledge, no motorized game cart has ever been equipped with a winch to facilitate the lifting of the game animal onto the cart. The present invention provides both a winch and a tailgate, which work together to allow hunters to move the animal into the cart more easily than with traditional game carts. The present invention can be used by one or two hunters simultaneously and includes the ability to put the cart in reverse gear.

Examples of the prior art include U.S. Pat. No. 2,855,061 (Liliental et al., 1958) and U.S. Pat. No. 2,869,661 (Fernandez, 1959), both of which disclose hand-guided carts with tandem (in-line) wheels that are powered by a gas engine. Neither of these carts includes a winch, tailgate or retractable outriggers. U.S. Pat. No. 3,055,449 (Murphy, 1962) provide a motorized game cart with a single wheel that is powered by an internal combustion engine. U.S. Pat. No. 3,212,595 (Mathews et al., 1965) provides a monowheel motorized litter with a hitch that allows it to be secured to a vehicle.

U.S. Pat. No. 6,811,179 (Woods, 2004) discloses a cart with in-line wheels and detachable handles (on one end of the frame only). U.S. Pat. No. 7,891,676 (Putman, 2011) involves a portable utility transport device in which the guidance frame is pivotally attached to the carrier frame. U.S. Pat. No. 8,366,125 (Loomans, 2013) describes a cart for transporting game in which the front and rear wheels are in-line, and the frame is wedge-shaped; the cart is not motorized. U.S. Pat. No. 8,613,455 (Berrett et al., 2013) provides a motorized litter with a single wheel that is powered by an electric motor and battery pack.

Finally, U.S. Patent Application Pub. No. 2004/0084864 (Casey et al.) involves a motorized single-wheel cart with stationary (non-adjustable) handles on the front and rear ends of the frame. None of the patent references discussed above incorporates all of the structural features of the present invention, including, but not limited to, a winch, a tailgate, adjustable outriggers, and a frame that is quickly and easily detached from the chassis, all of which is described more fully below.

BRIEF SUMMARY OF THE INVENTION

The present invention is a motorized cart comprising: a frame comprising a floor, a first elongated side wall, a second elongated side wall, a rear wall, and a front wall that is hingedly connected to the floor; a winch that is situated on the rear wall of the cart and that comprises a winch belt that extends forward from the rear wall and a hook on a first end of the winch belt; two wheels that are longitudinally aligned with one another so that one wheel is directly in front of the other wheel, the wheels being centered longitudinally within the floor of the cart; and an electric motor that is powered by a battery. In a preferred embodiment, each of the two wheels extends upward into a wheel well in the floor of the cart, and a top part of each wheel well extends above the floor.

In a preferred embodiment, each of the first elongated side wall, second elongated side wall, rear wall and front wall slants outward relative to the floor. Preferably, the winch comprises a removable winch handle that is stowed in a bracket on the rear wall of the cart. In a preferred embodiment, the invention further comprises a brake system that is configured to brake both wheels simultaneously, the brake system comprising a first brake handle that is located on a front handlebar that is situated above and in front of the front wall and a second brake handle that is located on a rear handlebar that is situated above and behind the rear wall.

In a preferred embodiment, the invention further comprises first, second, third and fourth outriggers, the first outrigger being situated on a front end of the first elongated side wall, the second outrigger being situated on a front end of the second elongated side wall, the third outrigger being situated on a rear end of the first elongated side wall, and the fourth outrigger being situated on a rear end of the second elongated side wall, each of the first, second, third and fourth outriggers comprising: an outrigger bracket that extends downward and is attached to the frame at a point proximate to a bottom corner of the frame; a pivoting member that is pivotally attached to the bracket; a locking pin that secures the pivoting member within the bracket; and a telescoping member that fits within a bottom end of the pivoting member and includes a plurality of apertures through which a spring-loaded pin extends. Preferably, each outrigger comprises a cleat that is situated on a distal end of the telescoping member, the cleat being slanted so that an outer end of the cleat is lower than an inner end of the cleat.

In a preferred embodiment, the invention further comprises two front handlebars that are situated above and in front of the front wall and two rear handlebars that are situated above and behind the rear wall, and each of the two front and two rear handlebars is removable and adjustable in height. Preferably, the cart is configured to operate in forward and reverse gear.

In a preferred embodiment, the invention further comprises a chassis that is rectangular in shape, the two wheels are situated on one side of the chassis and a chain case is situated on an opposite side of the chassis, and the chassis is removably connected to the frame. Preferably, the chassis is secured to the frame by at least two but no more than four bolts that extend through the floor of the cart and through the chassis. In a preferred embodiment, the invention further comprises a mud guard situated on an underside of the frame rearward of each of the two wheel wells.

REFERENCE NUMBERS

Figure 1:
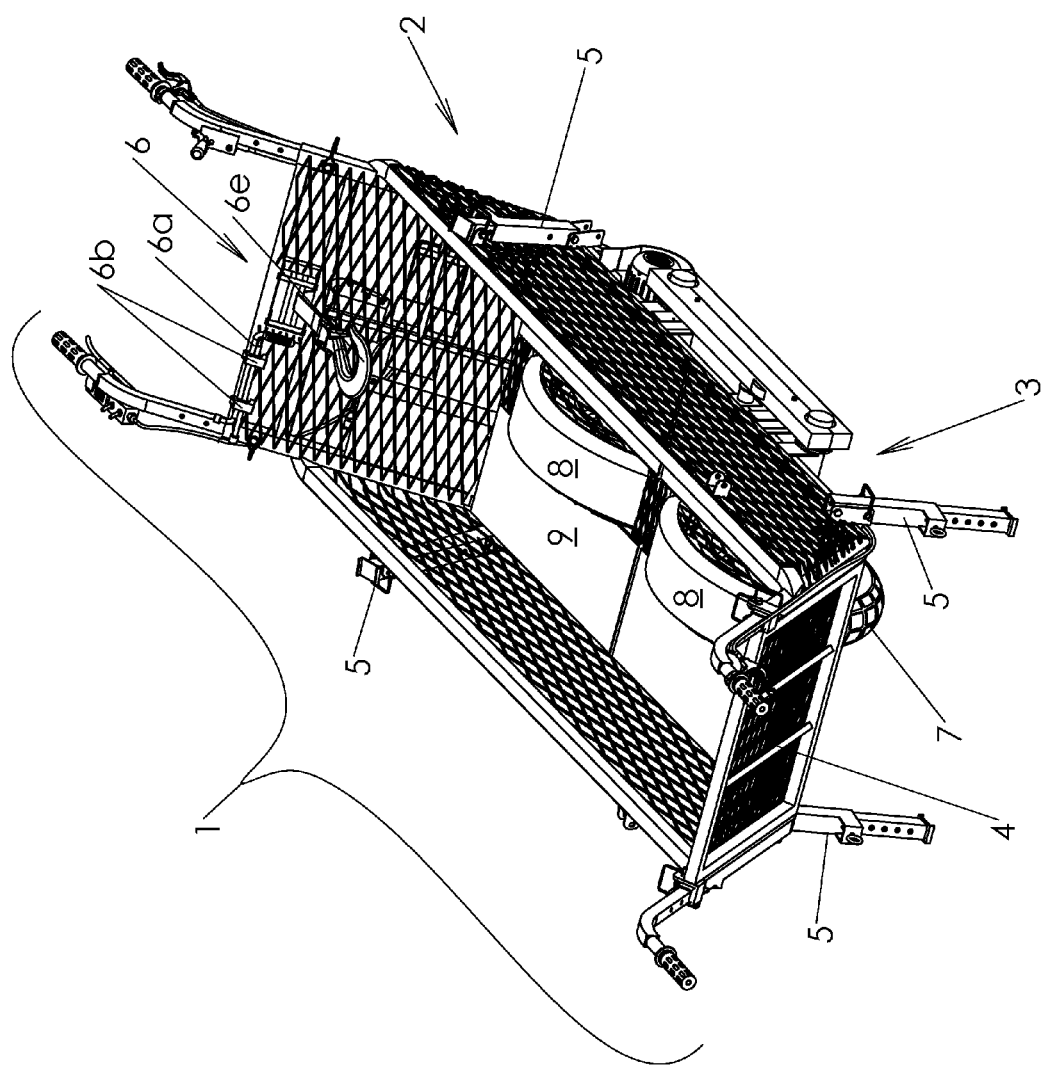
FIG. 1 is a front perspective view of the present invention.

1 Game cart
2 Frame
3 Chassis
4 Tailgate
5 Outrigger
5a Outrigger bracket
5b Pivoting member
5c Bolt
5d Locking pin
5e Telescoping member
5f Apertures (in telescoping member)
5g Spring-loaded pin
5h Bracket
5i Cleat
6 Winch
6a Winch handle
6b Brackets
6c Winch drive shaft
6d Winch belt
6e Hook
6f Bracket
6g Winch housing
6h Winch spool
6i Winch lock
7 Wheel
8 Wheel well (in floor of cart)
9 Floor (of cart)
10 Brake system
11 Handlebar
11a Grip section (of handlebar)
11b Telescoping section (of handlebar)
11c Locking pin
12 Throttle
13 Motor
14 Battery pack
15 Gear switch
16 Front wall/tailgate
16a Bracket
16b Locking pin
17 Master switch
17a On/off switch
17b Forward/reverse switch
18 Voltage meter
19 Controller
20 Electrical connection box
21 Bracket
22 Bolt
23 Motor guard
24 Hinge
25 Chain case
26 Chain case cover
27 Chain drive
28 Cam gear
29 Mud guard
30 Differential shift lever
31 Pivot switch
32 Hinge

DETAILED DESCRIPTION OF INVENTION

FIG. 1 is a front perspective view of the present invention. The present invention is a game cart 1 that is comprised of a frame 2 and a chassis 3. The frame comprises a tailgate 4 and four adjustable outriggers 5. Attached to the frame 2 is a winch 6 (shown in greater detail in FIG. 17). As shown in FIG. 1, the two wheels 7 are preferably aligned with one another so that they share the same longitudinal axis (that is, front to rear), and the top part of each wheel well 8 extends above the floor 9 of the cart. The center of gravity has been intentionally lowered in this particular cart design to offset any instability that might be created by aligning the wheels in-line as opposed to side-by-side.

Figure 2:
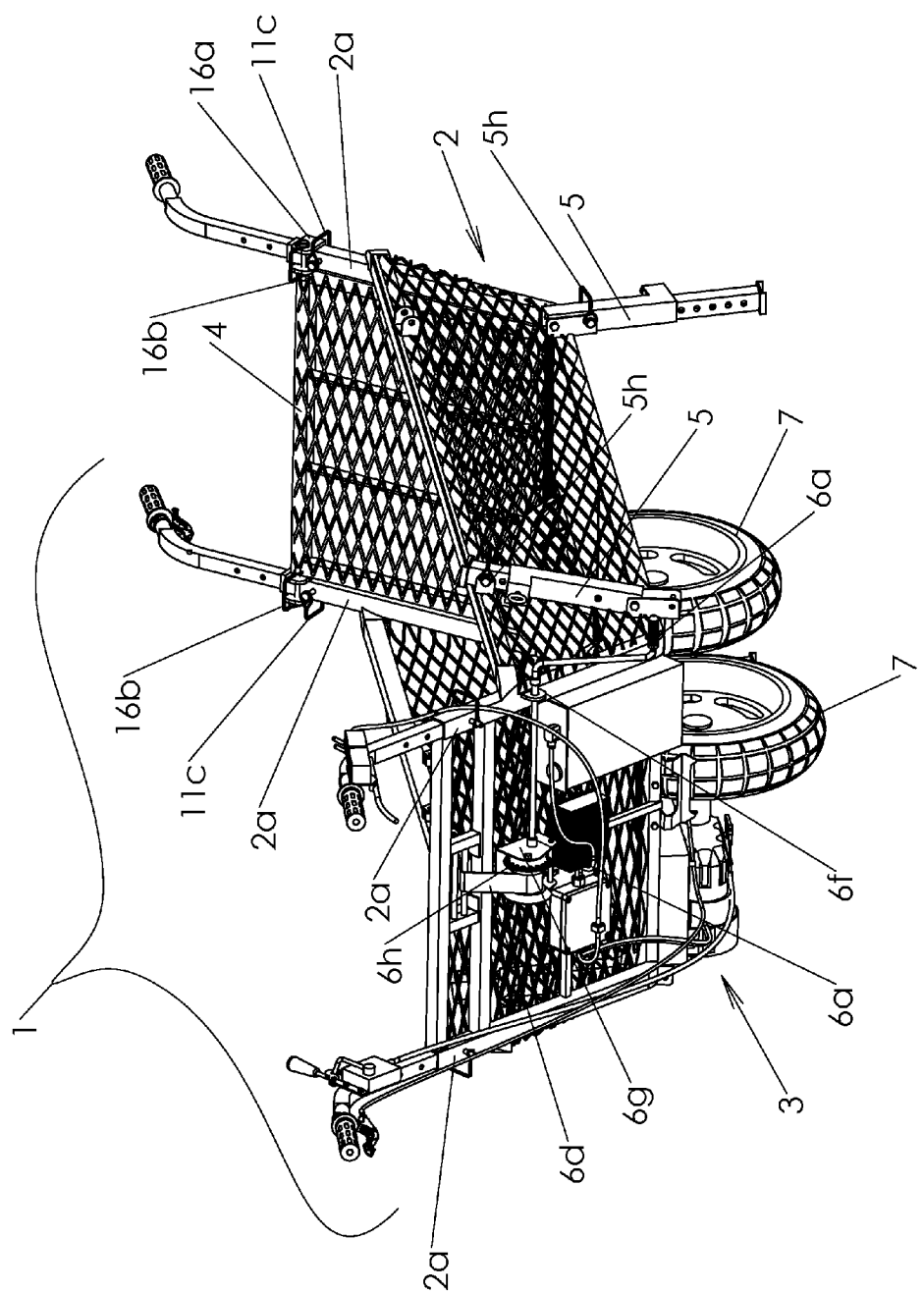
FIG. 2 is a rear perspective view of the present invention.

FIG. 2 is a rear perspective view of the present invention. As shown in this figure, the winch 6 is activated by a winch handle 6a that is inserted into the winch drive shaft 6c and that acts as a hand crank. The winch handle 6a is preferably stowed in a pair of brackets 6b on the top front side of the rear wall of the frame (see FIG. 1). The winch belt 6d extends through a slot in the top of the rear wall of the frame 2 and is attached to a hook 6e. The hook 6e is used to secure the winch around the game animal itself or to a rope that is secured around the game animal. Note that the winch handle 6a is inserted into a bracket 6f that is welded to the rear surface of one of the four primary support members 2a of the frame 2 and then into the winch drive shaft 6c. The winch drive shaft 6c protrudes from the winch housing 6g, which surrounds the winch spool 6h. The winch 6 is preferably mounted on the outside of the rear wall of the frame toward the top of the rear wall and centered (right to left) on the rear wall.

Figure 3:
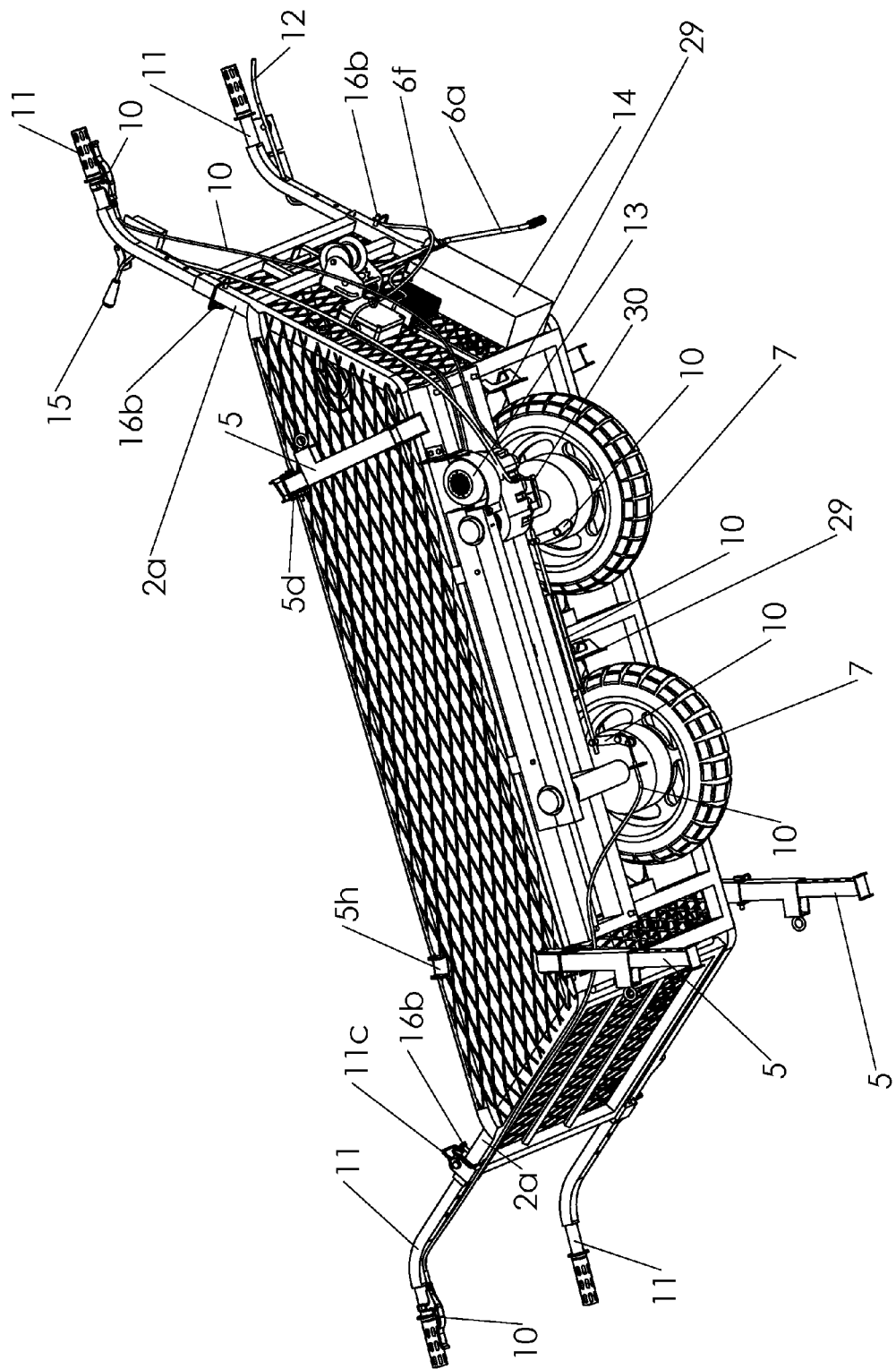
FIG. 3 is a bottom perspective view of the present invention.

FIG. 3 is a bottom perspective view of the present invention. In this view, the two rear outriggers 5 have been pivoted upward and secured in the stowed position, whereas the two front outriggers 5 are pivoted downward and locked into place in an extended position. The outriggers are discussed in greater detail in connection with FIG. 4. As shown in this figure, the invention comprises a brake system 10 that is operable from both the front and the rear of the cart; note that there are brake handles on both the left front and left rear handlebars 11, and the brakes on the front and rear wheels are preferably linked so that the brake handle on either the front or rear of the cart operates to activate the brakes on both wheels. The brake system that is shown in this figure is a mechanical brake system, but the invention is not limited to any particular brake system (for example, hydraulic brakes could be used). The significant aspect of the invention relative to the brake system is that it is operable from both the front and the rear of the cart and that both wheels are controlled simultaneously. This figure also shows the differential shift lever 30, which operates in conjunction with the gear control 15. FIG. 3 also shows the throttle 12, which is connected via electrical cabling to a differential electric motor 13. The motor 13 is powered by a battery pack 14. A gear control 15 on the left rear handlebar enables the operator to put the motor in neutral, high or low gear.

Figure 4:
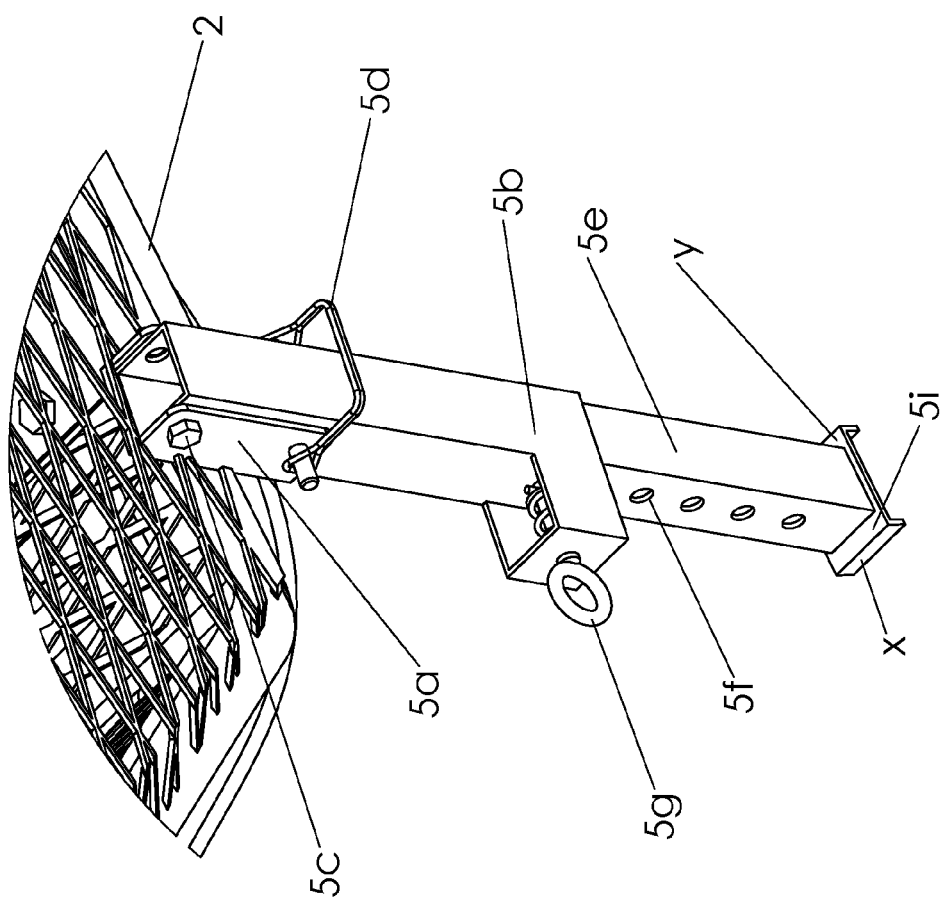
FIG. 4 is a detail view of an outrigger.

FIG. 4 is a detail view of an outrigger. As shown in this figure, each outrigger 5 comprises an outrigger bracket 5a that extends downward and is attached to the frame 2 at a point proximate to the one of the four bottom corners of the frame. The outrigger 5 further comprises a pivoting member 5b that is pivotally attached to the bracket 5a by a bolt 5c. A locking pin 5d secures the pivoting member 5b within the bracket 5a. The outrigger 5 further comprises a telescoping member 5e that fits within the bottom end of the pivoting member 5b and includes a plurality of apertures 5f through which a spring-loaded pin 5g extends. In this manner, the length of the outrigger 5 can be adjusted by pulling on the pin 5g, moving the telescoping member 5e up or down within the pivoting member 5b, and releasing the pin in one of the apertures 5f in the telescoping member 5e. Similarly, the telescoping member 5e can be completely removed from the pivoting member 5b by pulling on the pin 5g to release the telescoping member. When the outrigger 5 is pivoted completely upward (as shown in FIG. 2 with regard to the rear outriggers), the telescoping member 5e is secured to the frame 2 by inserting the locking pin 5d into a bracket 5h located just underneath the top edge of the frame.

Another important feature of the outrigger 5 is the cleat 5i located on the bottom end of each outrigger. The cleat 5i serves to dig into ice, snow or ground and is preferably slanted so that the outer end (indicated with an "X" in FIG. 4) is lower than the inner end (indicated with a "Y" in FIG. 4) of the cleat 5i.

Figure 5:
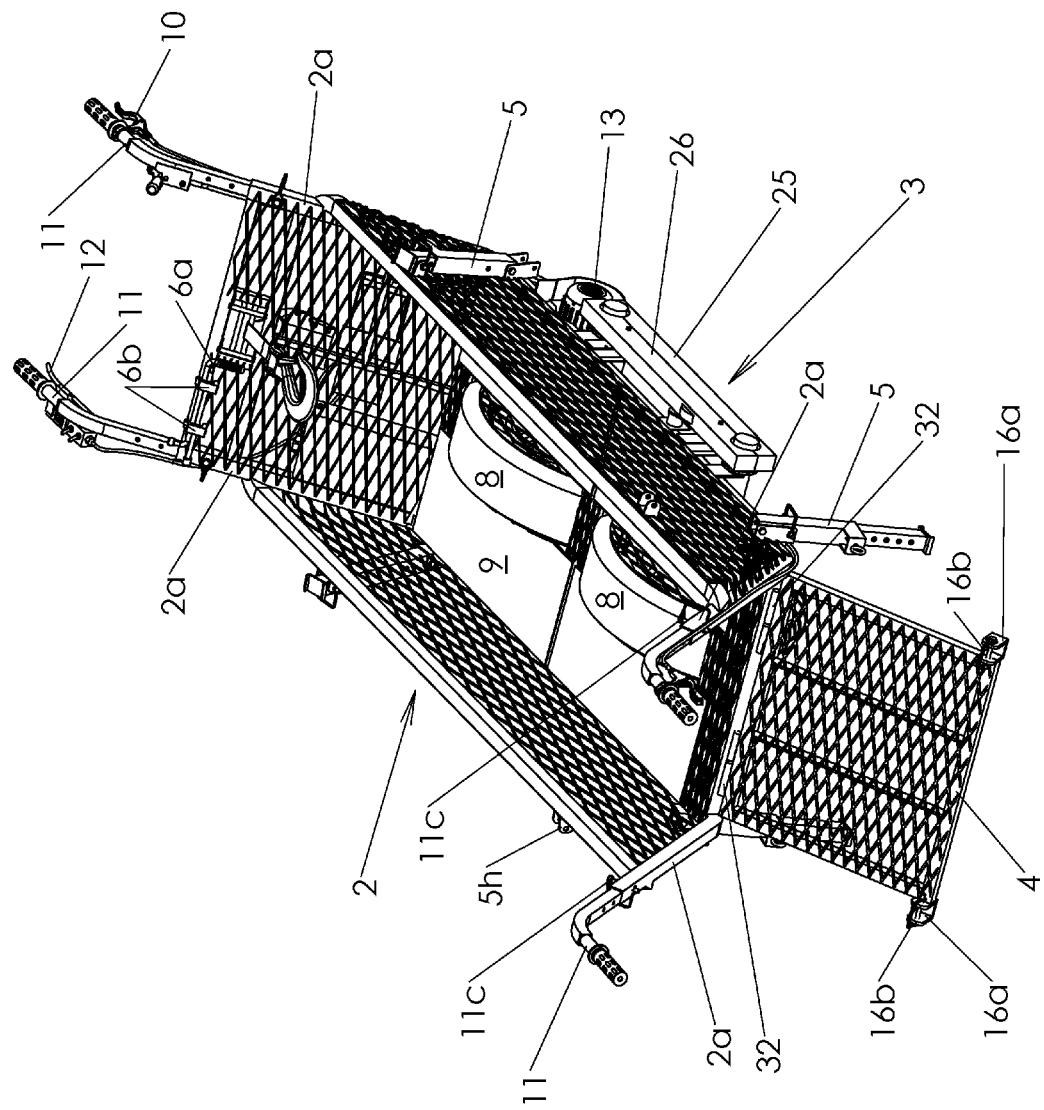
FIG. 5 is front perspective view of the present invention with the tailgate in an open position.

FIG. 5 is front perspective view of the present invention with the tailgate in an open position. As this figure illustrates, the front wall 16 (or tailgate) of the frame is attached to the floor 9 of the frame 2 via hinges 32 that are located on the front end of the floor 9. The tailgate enables hunters to rotate the front wall downward so that it serves as a ramp into the cart (for loading game). When the tailgate is in a closed position (as shown in FIG. 1), it is secured to the front of the frame 2 by brackets 16a that fit around three sides of the primary support members 2a and are secured with locking pins 16b. Note that the frame 2 is comprised of four walls (two side walls, a front wall/tailgate, and a rear wall) and that each of the walls preferably slants outward relative to the floor 9. The frame 2 is also comprised of four primary support member 2a that adjoin the side walls to the front or rear wall.

Figure 6:
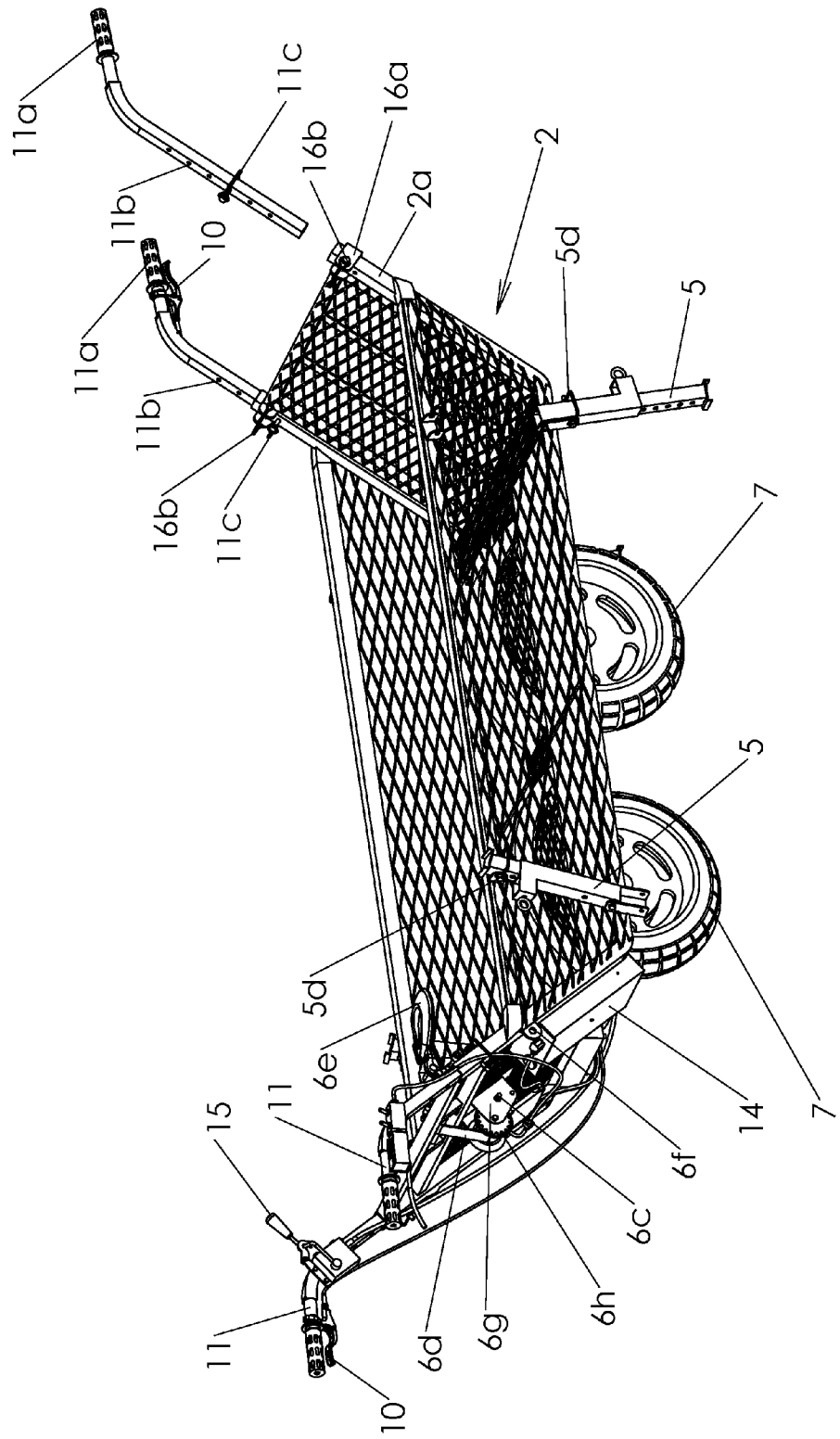
FIG. 6 is a side perspective view of the present invention with one of the handlebars detached.

FIG. 6 is a side perspective view of the present invention with one of the handlebars detached. As shown in this figure, each handlebar 11 is preferably both adjustable and removable. The handlebar 11 is comprised of a grip section 11a and a telescoping section 11b that fits into the top end of the primary support member 2a. Apertures in the telescoping section 11b allow the overall length of the handlebar 11 to be adjusted. A locking pin 11c secures the handlebar 11 in the primary support member 2a.

Figure 7:
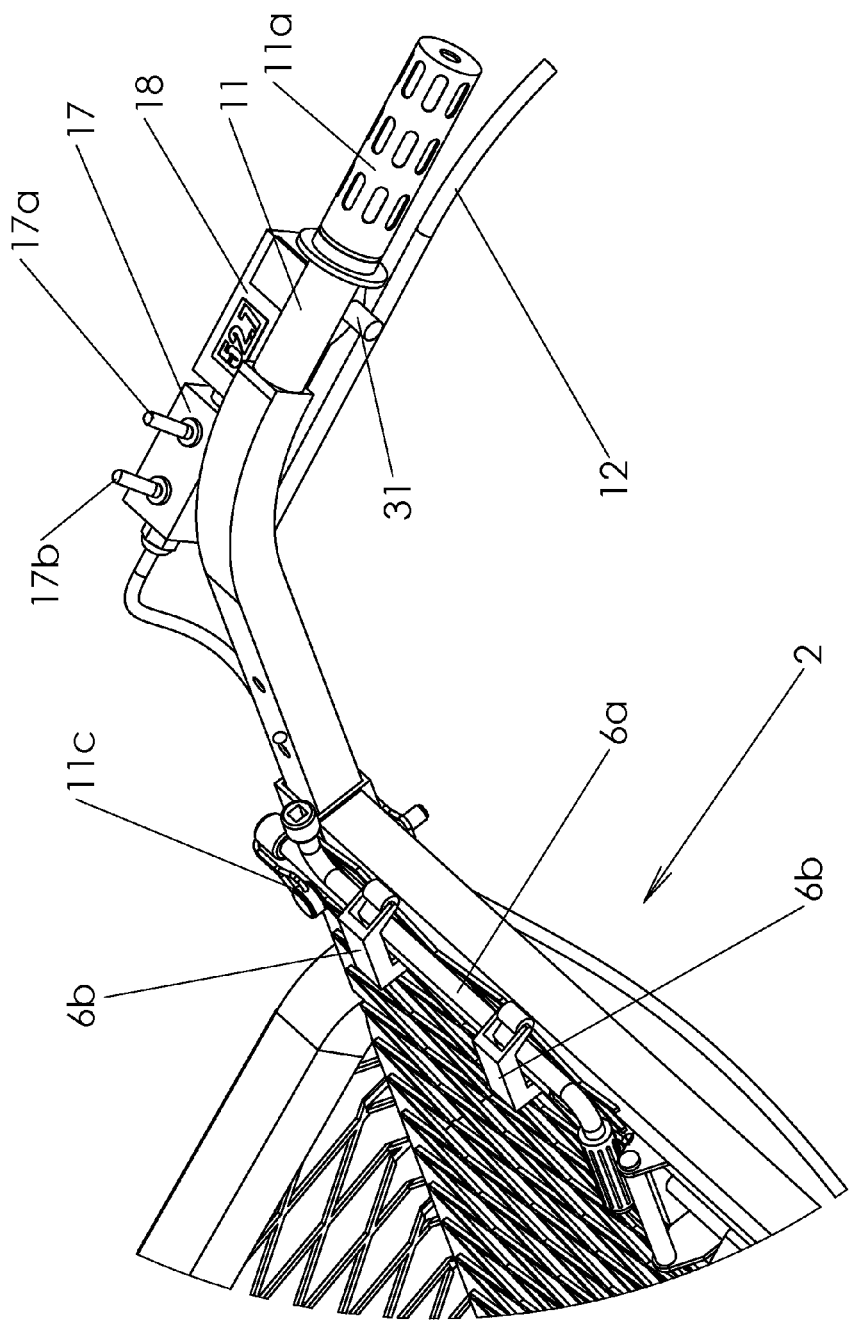
FIG. 7 is a detail view of the master switch and throttle.

FIG. 7 is a detail view of the master switch and throttle. In a preferred embodiment, the master switch 17 comprises an on/off switch 17a and a forward/reverse switch 17b. Preferably, the invention further comprises a voltage meter 18 that indicates to the operator the level of voltage coming from the battery pack 14. A pivot switch 31 rotates the potentiometer to control the speed of the cart when the throttle lever is squeezed.

Figure 8:
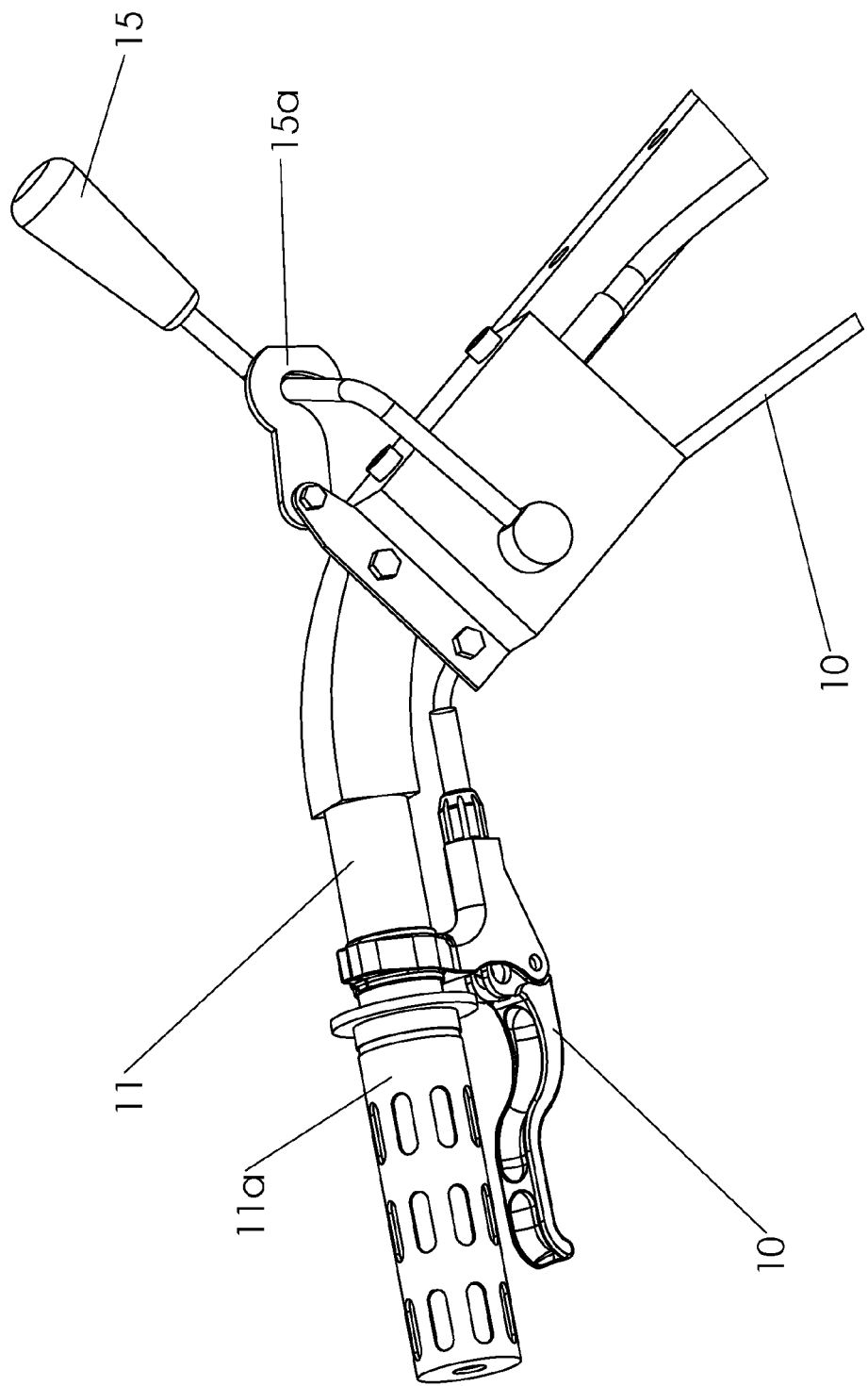
FIG. 8 is a detail view of the gear control.

FIG. 8 is a detail view of the gear control. As noted above, the gear control 15 enables the operator to put the cart (motor) in high, low or neutral gear. As shown in FIG. 8, the cart is in neutral gear; to put the cart in high gear, the gear control would be removed from its locked position and pushed fully downward (forward). To put the cart in low gear, the hook 15a would be rotated upward (rearward) to free the gear control 15 from the neutral position, and the gear control 15 would then be pushed upward (rearward) as far as it can go.

Figure 9:
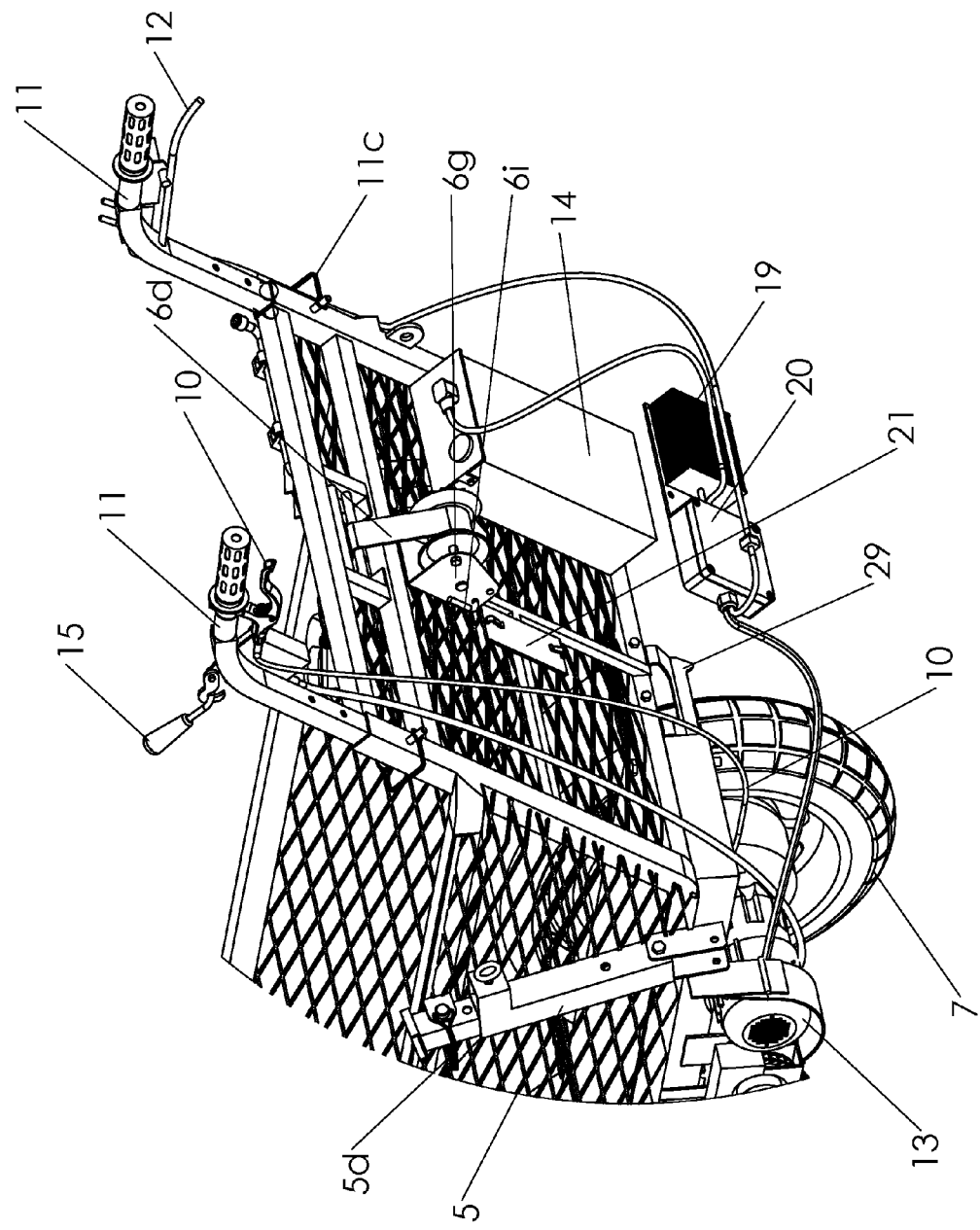
FIG. 9 is a detail view of the rear end of the invention with the electrical box detached from the rear wall of the cart.

FIG. 9 is a detail view of the rear end of the invention with the electrical panel detached from the rear wall of the cart. As shown in this figure, the electrical panel is comprised of a controller 19 and a waterproof electrical connection box 20. The electrical panel can be affixed to the rear wall by clipping the electrical panel onto a bracket 21.

Figure 10:
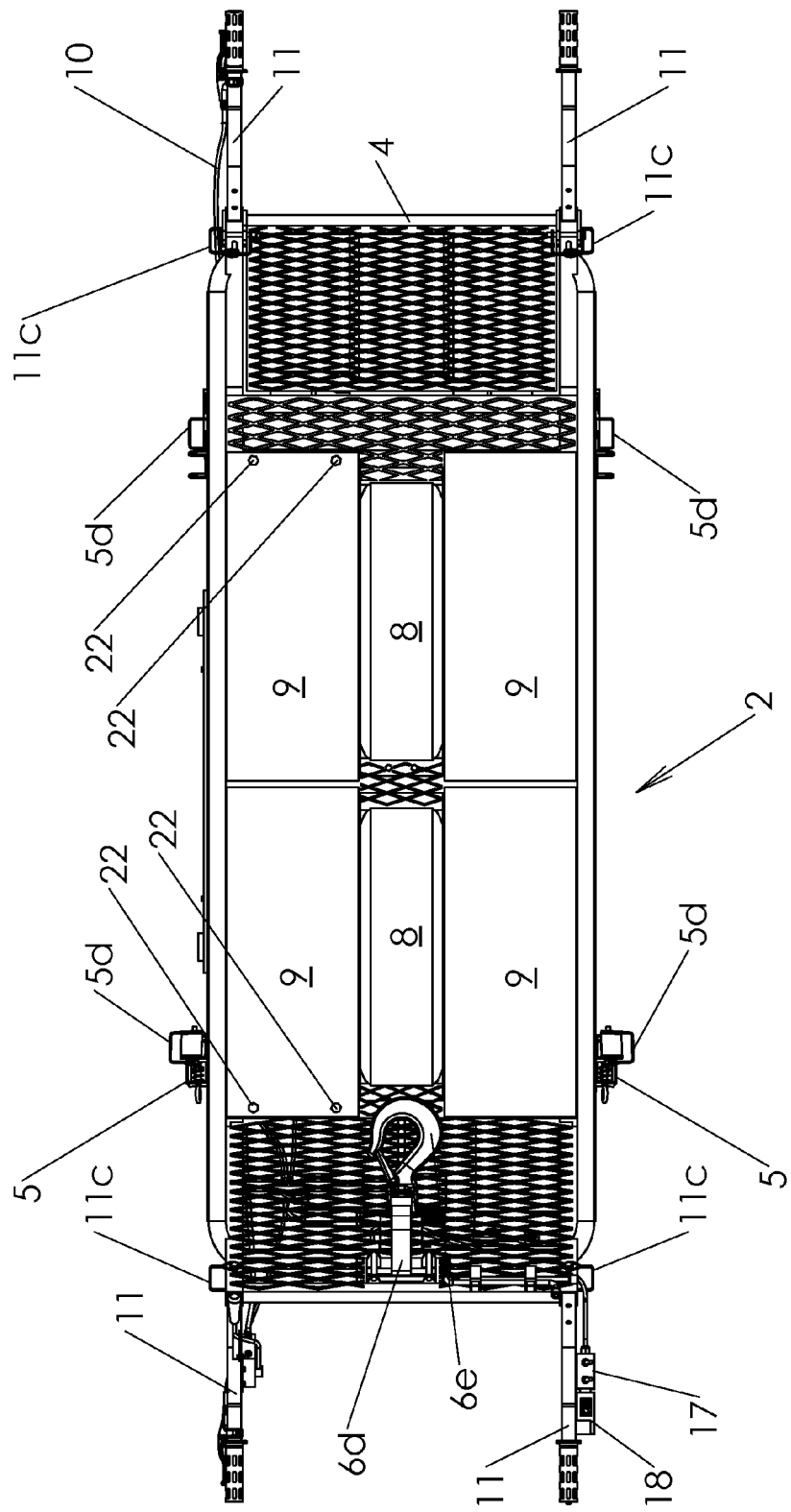
FIG. 10 is a top view of the present invention.

FIG. 10 is a top view of the present invention. One of the most significant features of the present invention is the fact that the frame 2 can be removed from the chassis 3 by unscrewing only four nuts (not shown). These four nuts are situated underneath the chassis and surround the bolts 22 whose heads are shown on the floor 9 of the frame 2 in FIG. 10. Note that these bolts are located at the front and rear ends of the floor 9 on the left side of the cart only; however, the present invention is not limited to the bolts being on the left side (they could be located on the right side of the cart only). Note that the wheel wells 8 are centered (right to left) within the floor 9 of the cart. Note also that the winch 6 is aligned with the wheel wells 8.

Figure 11:
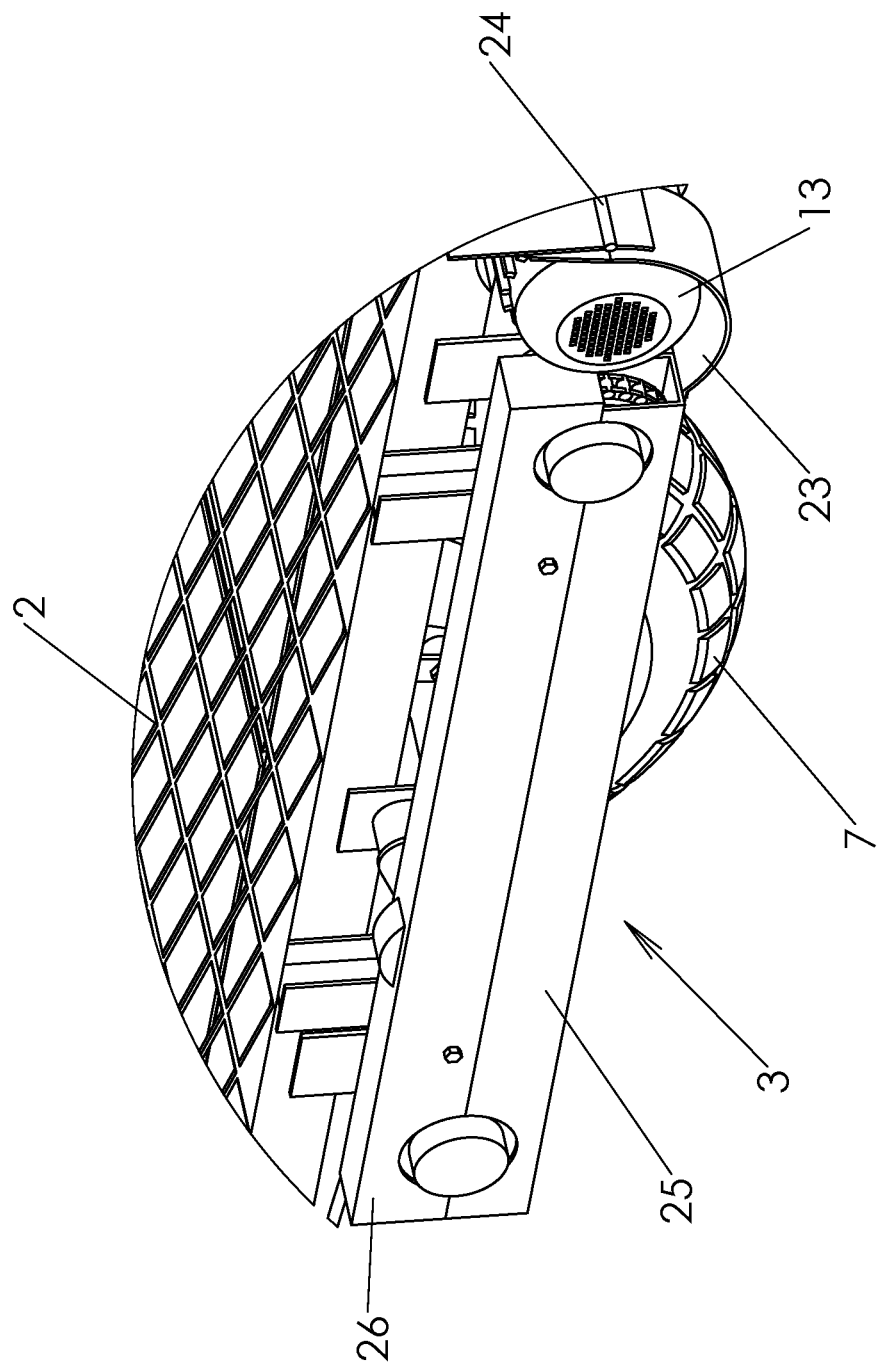
FIG. 11 is detail view of the chain case and chain case cover.

FIG. 11 is detail view of the chain case and chain case cover. This figure shows the motor 13, which is protected on its bottom and rear sides by a pivotable motor guard 23. The motor guard 23 rotates on a hinge 24, and the pivoting end of the motor guard is fastened to the bottom of the chain case 25 with a bolt (not shown). The purpose of the motor guard 23 is to lessen exposure of the motor to dirt, debris and/or rocks on the trail. The chain case cover 26 is situated on top of the chain case 25, and its purpose is to protect the chain drive within the chain case 25.

Figure 12:
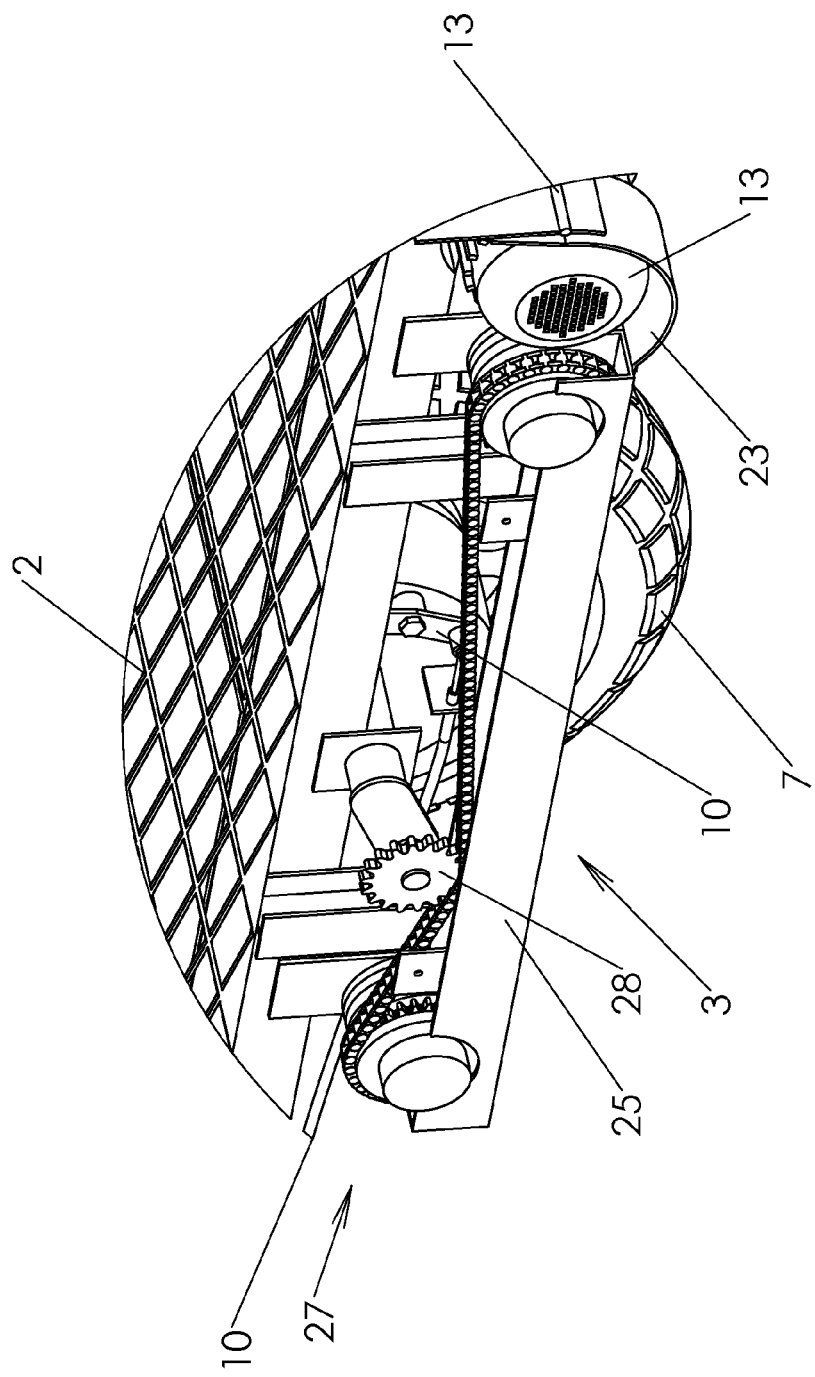
FIG. 12 is a detail view of the chain case without the cover.

FIG. 12 is a detail view of the chain case without the cover. As shown in this figure, the chain case 25 contains the chain drive 27. A cam gear 28 is used to tighten the chain if and when it becomes loosened as a result of ordinary wear and tear or for any other reason.

Figure 13:
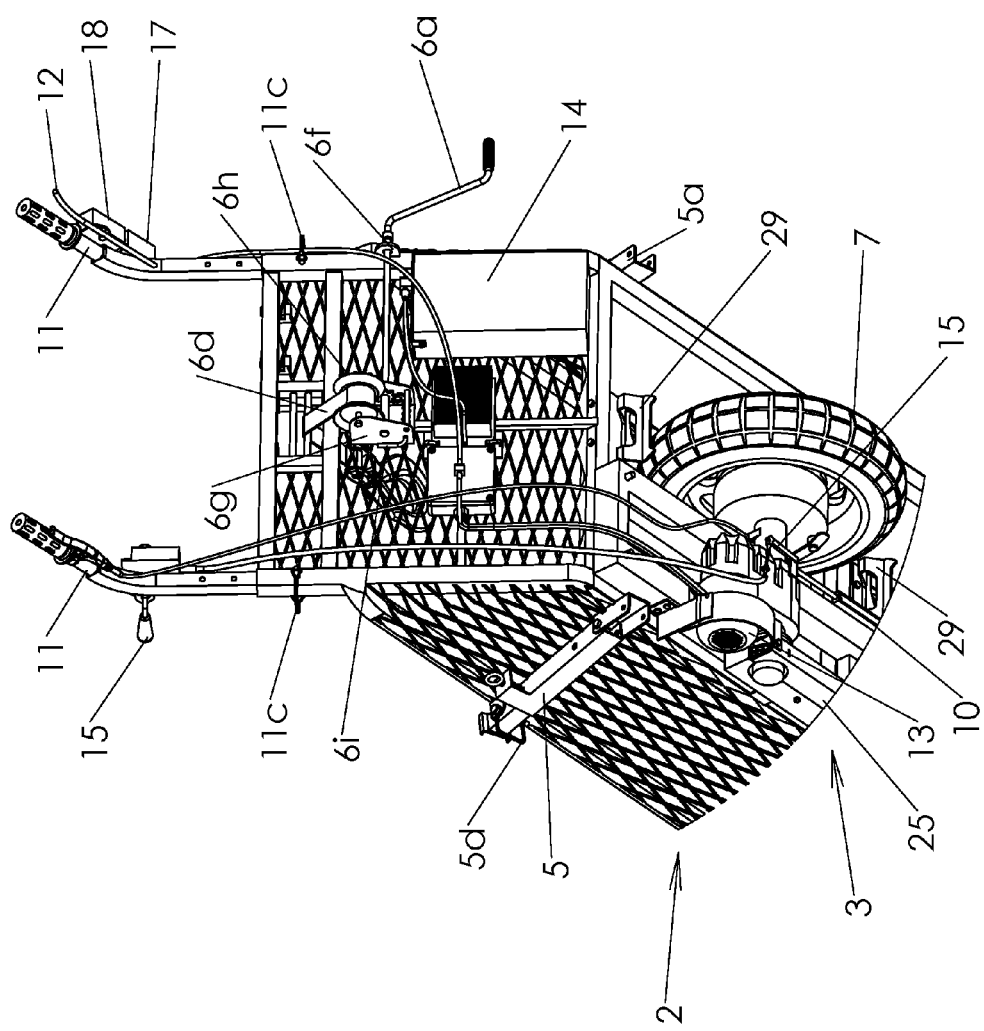
FIG. 13 is a detail view of the rear end of the invention with the electrical box attached to the rear wall of the cart.

FIG. 13 is a detail view of the rear end of the invention with the electrical box attached to the rear wall of the cart. This figure shows the winch lock 6i, which allows the winch to be locked or unlocked; when in a locked state, the winch belt is prevented from winding or unwinding on the winch spool 6h.

Figure 14:
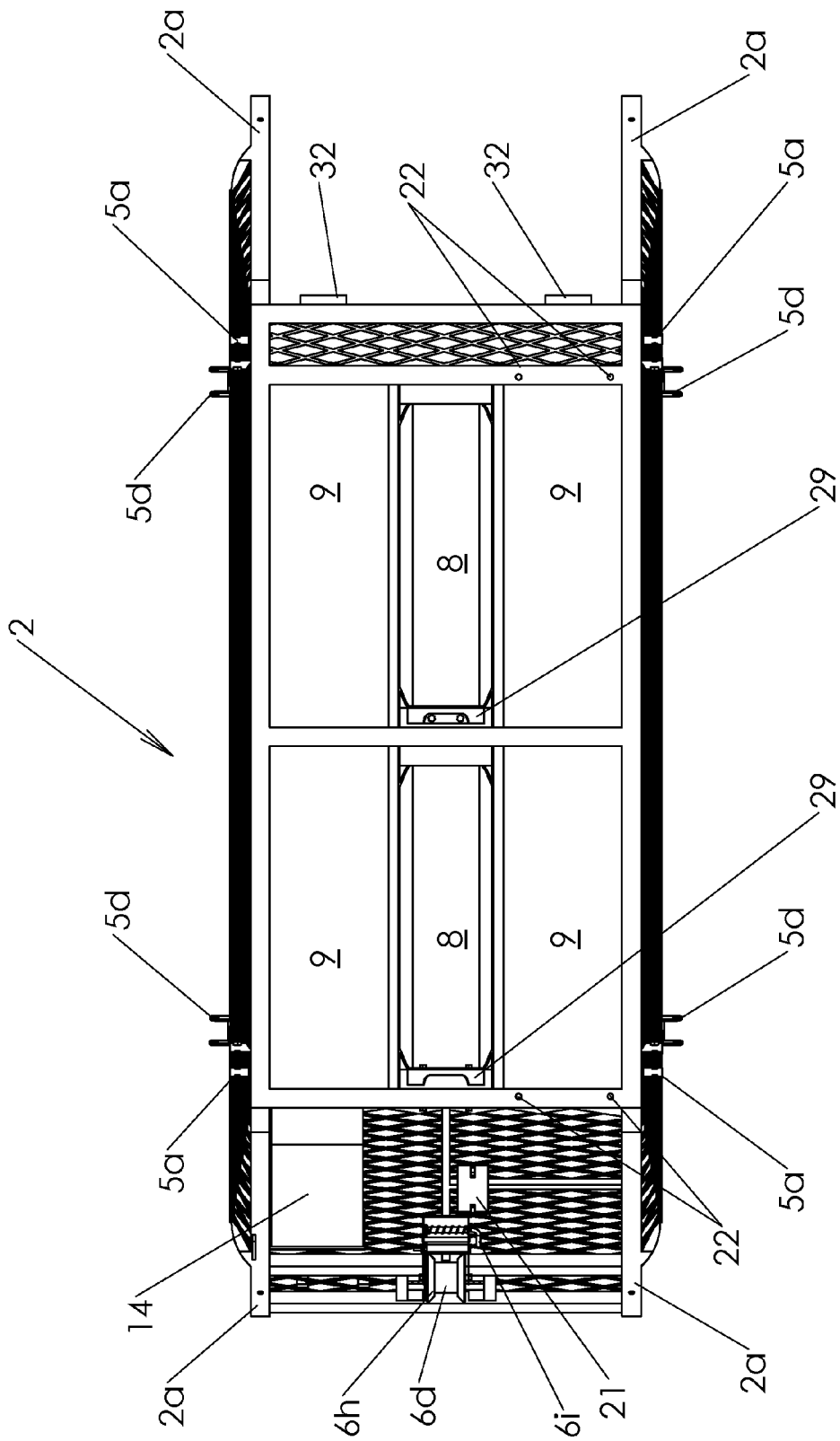
FIG. 14 is a bottom view of the frame removed from the chassis.

FIG. 14 is a bottom view of the frame removed from the chassis. The underside of the frame 2 preferably comprises mud guards 29 that are situated to the rear of each wheel 7. The nuts (not shown) that are discussed above in connection with FIG. 10 have been removed, but they would be screwed onto the ends of the bolts 22. The outriggers 5, electronics (battery pack 14, controller 19 and electrical connection box 20) and handlebars 11 have been omitted from this figure for clarity.

Figure 15:
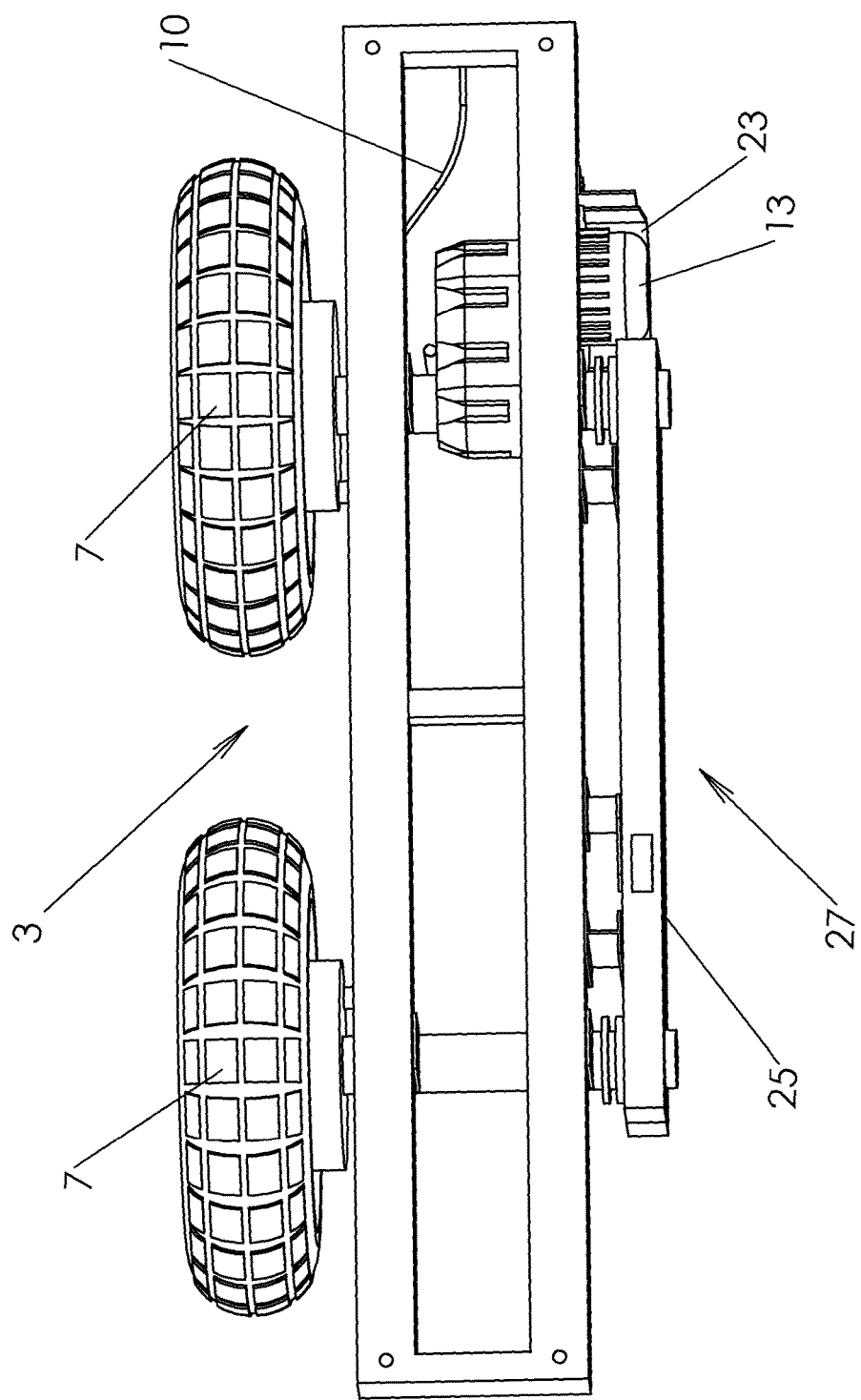
FIG. 15 is a top perspective view of the chassis with the frame removed.

FIG. 15 is a top perspective view of the chassis with the frame removed. As shown in this figure, in a preferred embodiment, the chassis 3 is a generally rectangular metal frame with the wheels 7 situated on one side of the chassis and the chain case 25 on the other side. The holes (not labelled) through which the bolts 22 are inserted to attach the frame 2 to the chassis 3 are also visible in this figure.

Figure 16:
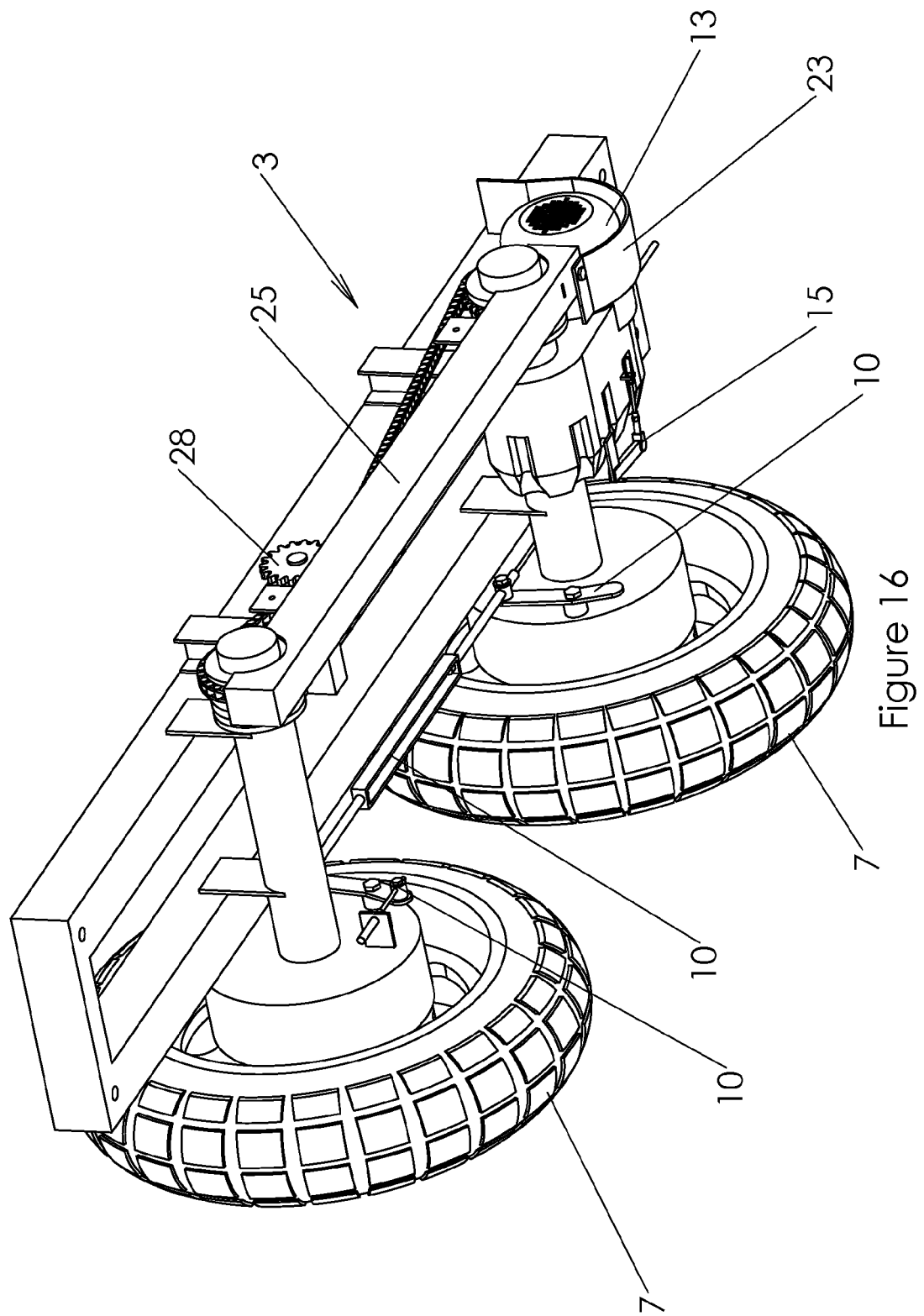
FIG. 16 is a bottom perspective view of the chassis with the frame removed.

FIG. 16 is a bottom perspective view of the chassis with the frame removed. All of the parts shown in this figure have been previously described.

Figure 17:
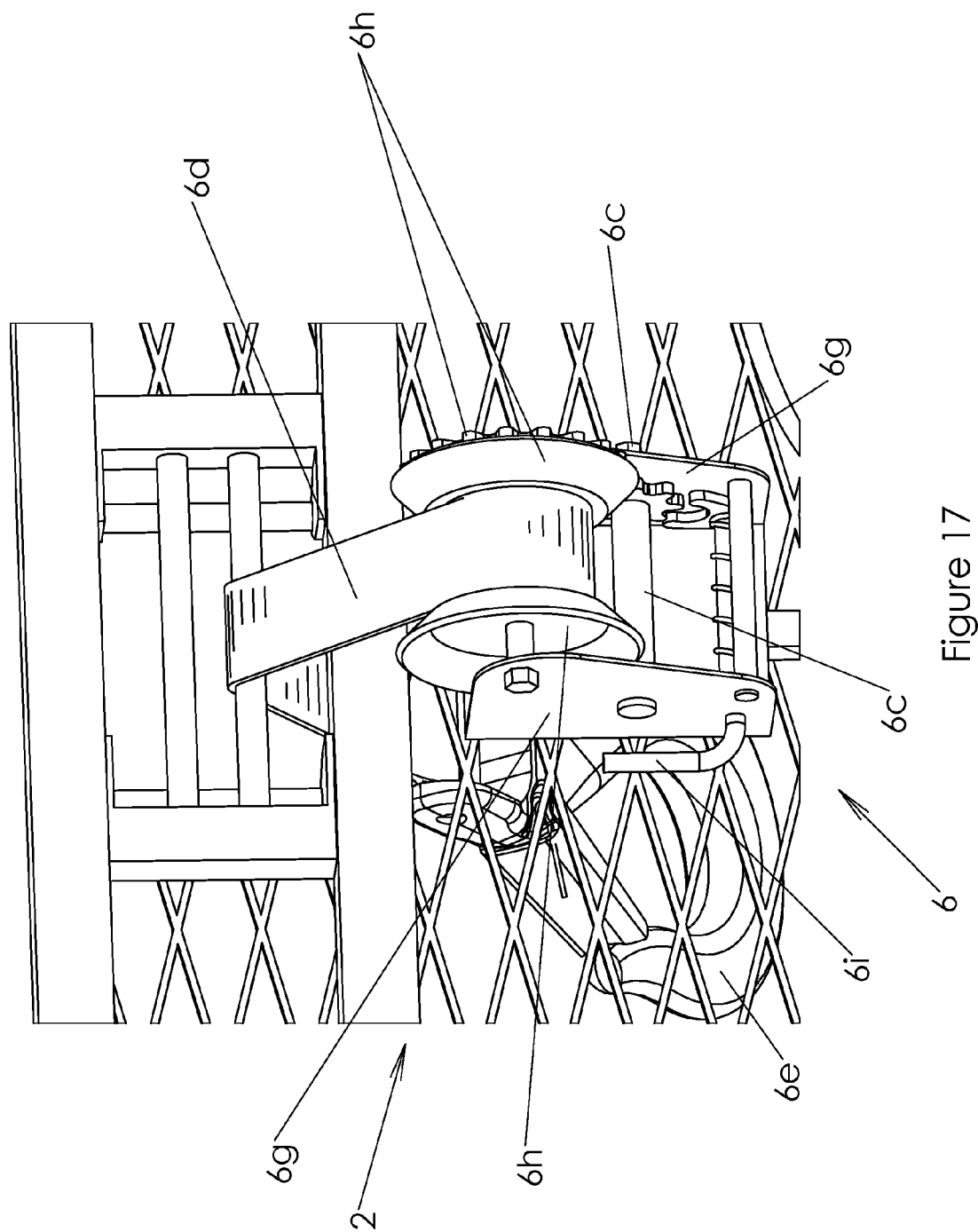
FIG. 17 is a detail view of the winch and winch parts.

FIG. 17 is a detail view of the winch and winch parts. When the winch handle 6a (not shown) engages the winch shaft 6c, a gear on the inside of the winch shaft 6c engages with a gear on the winch spool 6h, thereby causing the winch spool 6h to move in one of two directions (forward or backward). The present invention is not limited to any particular type of winch, and the winch shown in this figure is a typical hand winch. As shown in this figure, a key (not labeled) on the inside of the winch lock 6i selectively engages with the gear on the winch shaft 6c depending on the position of the winch lock handle (not separately labeled but shown on the outside of the winch housing 6g in FIG. 17).

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A motorized cart comprising:
    (a) a frame comprising a floor, a first elongated side wall, a second elongated side wall, a rear wall, and a front wall that is hingedly connected to the floor;
    (b) a winch that is situated on the rear wall of the cart and that comprises a winch belt that extends forward from the rear wall and a hook on a first end of the winch belt;
    (c) two wheels that are longitudinally aligned with one another so that one wheel is directly in front of the other wheel, the wheels being centered longitudinally within the floor of the cart;
    (d) an electric motor that is powered by a battery; and
    (e) a brake system that is configured to brake both wheels simultaneously, the brake system comprising a first brake handle that is located on a front handlebar that is situated above and in front of the front wall and a second brake handle that is located on a rear handlebar that is situated above and behind the rear wall.

2. The motorized cart of claim 1, further comprising a chassis that is rectangular in shape, wherein the two wheels are situated on one side of the chassis and a chain case is situated on an opposite side of the chassis, and wherein the chassis is removably connected to the frame,
    wherein the chassis is secured to the frame by at least two but no more than four bolts that extend through the floor of the cart and through the chassis.

3. A motorized cart comprising:
    (a) a frame comprising a floor, a first elongated side wall, a second elongated side wall, a rear wall, and a front wall that is hingedly connected to the floor;
    (b) a winch that is situated on the rear wall of the cart and that comprises a winch belt that extends forward from the rear wall and a hook on a first end of the winch belt;
    (c) two wheels that are longitudinally aligned with one another so that one wheel is directly in front of the other wheel, the wheels being centered longitudinally within the floor of the cart;
    (d) an electric motor that is powered by a battery; and
    (e) first, second, third and fourth outriggers, the first outrigger being situated on a front end of the first elongated side wall, the second outrigger being situated on a front end of the second elongated side wall, the third outrigger being situated on a rear end of the first elongated side wall, and the fourth outrigger being situated on a rear end of the second elongated side wall, each of the first, second, third and fourth outriggers comprising:
        an outrigger bracket that extends downward from the frame and is attached to the frame at a point proximate to a bottom corner of the frame;
        a pivoting member that is pivotally attached to the bracket;
        a locking pin that secures the pivoting member within the bracket; and
        a telescoping member that fits within a bottom end of the pivoting member and includes a plurality of apertures through which a spring-loaded pin extends.

4. The motorized cart of claim 3, wherein each outrigger comprises a cleat that is situated on a distal end of the telescoping member, the cleat being slanted so that an outer end of the cleat is lower than an inner end of the cleat.

* * * * *